(12) United States Patent
Guerin

(10) Patent No.: US 10,129,332 B2
(45) Date of Patent: *Nov. 13, 2018

(54) LOAD BALANCING OF DISTRIBUTED SERVICES

(71) Applicant: International Business Machines Corporation, Armonk, NY (US)

(72) Inventor: Xavier R. Guerin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,474

(22) Filed: Dec. 28, 2017

(65) Prior Publication Data

US 2018/0124165 A1 May 3, 2018

Related U.S. Application Data

(63) Continuation of application No. 15/684,209, filed on Aug. 23, 2017, which is a continuation of application
(Continued)

(51) Int. Cl.
*H04L 29/08* (2006.01)
*H04L 12/26* (2006.01)

(52) U.S. Cl.
CPC .......... *H04L 67/1004* (2013.01); *H04L 43/08* (2013.01); *H04L 67/1008* (2013.01)

(58) Field of Classification Search
CPC .. H04L 67/1004; H04L 43/08; H04L 67/1008
See application file for complete search history.

(56) References Cited

U.S. PATENT DOCUMENTS 6,205,477 B1 * 3/2001 Johnson ............ H04L 29/12066
709/203
6,883,028 B1 * 4/2005 Johnson ............ H04L 29/12066
709/203
(Continued)

OTHER PUBLICATIONS

Kruber, N., et al., "The Benefits of Estimated Global Information in DHT Load Balancing." 11th IEEE/ACM International Symposium on Cluster,Cloud and Grid Computing, pp. 382-391, May 2011, Germany. 978-0-7695-4395-6/11, copyright 2011 IEEE, DOI 10-1109/CCGrid. 2011.11.
(Continued)

*Primary Examiner* — Brian J. Gillis
*Assistant Examiner* — Javier O Guzman
(74) *Attorney, Agent, or Firm* — Fleit Gibbons Gutman Bongini Bianco PL; Thomas S. Grzesik

(57) ABSTRACT

Various embodiments load balance service requests across one or more servers. In one embodiment, a service requestor directly accesses a shared metrics array stored in at least one server of a plurality of servers in a service cluster. Each of these servers includes one or more services. The shared metrics array is accessible by each of the plurality of servers, and includes a set of metrics for each of the plurality of servers. A determination is made based on the set of metrics associated with at least one server in the plurality of servers if a service request is to be sent to the at least one server. The service request is sent to the at least one server based on determining that the service request is to be sent to the at least one sever.

16 Claims, 5 Drawing Sheets

Related U.S. Application Data

No. 15/456,715, filed on Mar. 13, 2017, now Pat. No. 9,774,665, which is a continuation of application No. 14/225,611, filed on Mar. 26, 2014, now Pat. No. 9,667,711.

(56) References Cited

U.S. PATENT DOCUMENTS

| | | | |
|---|---|---|---|
| 7,779,116 | B2 | 8/2010 | Stecher et al. |
| 7,962,914 | B2 | 6/2011 | Caccavale |
| 7,984,110 | B1 | 7/2011 | Raman et al. |
| 8,302,100 | B2* | 10/2012 | Deng .................. G06F 9/5044 |
| | | | 709/229 |
| 8,392,563 | B1 | 3/2013 | Masters |
| 8,412,581 | B1 | 4/2013 | Chinnappan et al. |
| 8,412,810 | B1* | 4/2013 | Tompkins ........... G06F 9/45558 |
| | | | 709/201 |
| 2002/0152301 | A1* | 10/2002 | Garrett ................ H04L 41/5012 |
| | | | 709/224 |
| 2004/0109447 | A1* | 6/2004 | Douglass ............. H04L 49/602 |
| | | | 370/389 |
| 2005/0038890 | A1 | 2/2005 | Masuda et al. |
| 2005/0102400 | A1* | 5/2005 | Nakahara ................ H04L 29/06 |
| | | | 709/225 |
| 2005/0265239 | A1* | 12/2005 | Previdi ................... H04L 45/24 |
| | | | 370/238 |
| 2006/0167939 | A1* | 7/2006 | Seidman ............. G06F 11/3616 |
| 2006/0224725 | A1* | 10/2006 | Bali ................... H04L 67/1008 |
| | | | 709/224 |
| 2007/0143460 | A1* | 6/2007 | Ben-David ............. G06F 9/505 |
| | | | 709/223 |
| 2011/0119328 | A1* | 5/2011 | Simitci ................ G06F 3/0611 |
| | | | 709/203 |
| 2012/0036515 | A1 | 2/2012 | Heim |
| 2012/0155266 | A1 | 6/2012 | Patel et al. |
| 2013/0036272 | A1 | 2/2013 | Nelson |
| 2013/0198312 | A1 | 8/2013 | Tamir et al. |
| 2013/0198424 | A1 | 8/2013 | Randhawa et al. |
| 2014/0047014 | A1* | 2/2014 | Watanabe ........... H04L 67/2814 |
| | | | 709/203 |
| 2014/0181828 | A1* | 6/2014 | Bird ...................... G06F 9/5016 |
| | | | 718/103 |
| 2014/0267571 | A1 | 9/2014 | Periyannan et al. |
| 2014/0379506 | A1* | 12/2014 | Marshall ................ H04L 47/12 |
| | | | 705/26.1 |

OTHER PUBLICATIONS

Ohta, S., et al., "WWW Server Load Balancing Technique Based on Passive Performance Measurement." Department of Information Systems Engineering, Toyama Prefectural University. May 2009. 978-1-4244-3388-9/09 copyright 2009 IEEE.

Hogqvist, M., et al., "Passive/Active Load Balancing with Informed Node Placement in DHTs." IFIP International Federation for Information Processing, 2009, pp. 101-112, Mar. 2009. T. Spyropoulos and K.A Hummel: (EDS) IWSOS 2009, LNCS 5918.

Non-Final Rejection dated Mar. 10, 2016, received for U.S. Appl. No. 14/225,611.

Final Rejection dated Sep. 9, 2016, received for U.S. Appl. No. 14/225,611.

Notice of Allowance dated Jan. 27, 2017, received for U.S. Appl. No. 14/225,611.

* cited by examiner

LOAD BALANCING OF DISTRIBUTED SERVICES

BACKGROUND

The present disclosure generally relates to distributed services, and more particularly relates to load balancing distributed services.

A service can be generally described as a set of software functionalities/capabilities that can be utilized for different purposes. These capabilities are accessed utilizing one or more interfaces according to a specification associated with the service. Many services such as internet or web-based services often require multiple callbacks to secondary services. Each of these services and sub-services are generally distributed across multiple web servers. Therefore, balancing of incoming requests is usually performed to guarantee fairness and efficiency while serving these requests.

Conventional load balances are generally live/active server processes that act as proxy between the service requesters and servers hosting the services. The requesters send their service requests to the load balancer(s) who then dispatches the requests to the appropriate servers. These conventional load balancers have numerous drawbacks. For example, the number of load balancers is usually fewer than the number of service requesters, which results in the load balancers becoming a bottleneck in the system. The latency of a service call is at least doubled since conventional load balancers are usually situated in between requesters and the servers hosting the services. Also, since conventional load balancers are live processes they consume CPU time, memory, trash caches, etc.

BRIEF SUMMARY

In one embodiment, a method for load balancing service requests across one or more servers is disclosed. The method comprises accessing, by a service requestor, a shared metrics array stored in at least one server of a plurality of servers in a service cluster. Each of the plurality of servers comprises one or more services. The shared metrics array is directly accessed by the service requestor without involving a processor of the at least one server. The shared metrics array being accessible by each of the plurality of servers, and comprises a set of metrics for each of the plurality of servers. A determination is made based on the set of metrics associated with at least one server in the plurality of servers if a service request is to be sent to the at least one server. The service request is sent to the at least one server based on determining that the service request is to be sent to the at least one sever.

In another embodiment, an information processing system for load balancing service requests across one or more servers is disclosed. The information processing system comprises a processor and a memory communicatively coupled to the processor. A load balancer is communicatively coupled to the processor and the memory. The load balancer is configured to perform a method. The method comprises accessing, by the information processing system, a shared metrics array stored in at least one server of a plurality of servers in a service cluster. Each of these servers comprises one or more services. The shared metrics array is directly accessed by the load balancer without involving a processor of the at least one server. The shared metrics array being accessible by each of the plurality of servers, and comprises a set of metrics for each of the plurality of servers. A determination is made based on the set of metrics associated with at least one server in the plurality of servers if a service request is to be sent to the at least one server. The service request is sent to the at least one server based on determining that the service request is to be sent to the at least one sever.

In yet another embodiment, a computer program storage product for load balancing service requests across one or more servers is disclosed. The computer program storage product comprises instructions configured to perform a method on an information system. The method comprises accessing, by the information processing system, a shared metrics array stored in at least one server of a plurality of servers in a service cluster. Each of these servers comprises one or more services. The shared metrics array is directly accessed by the service requestor without involving a processor of the at least one server. The shared metrics array being accessible by each of the plurality of servers, and comprises a set of metrics for each of the plurality of servers. A determination is made based on the set of metrics associated with at least one server in the plurality of servers if a service request is to be sent to the at least one server. The service request is sent to the at least one server based on determining that the service request is to be sent to the at least one sever.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
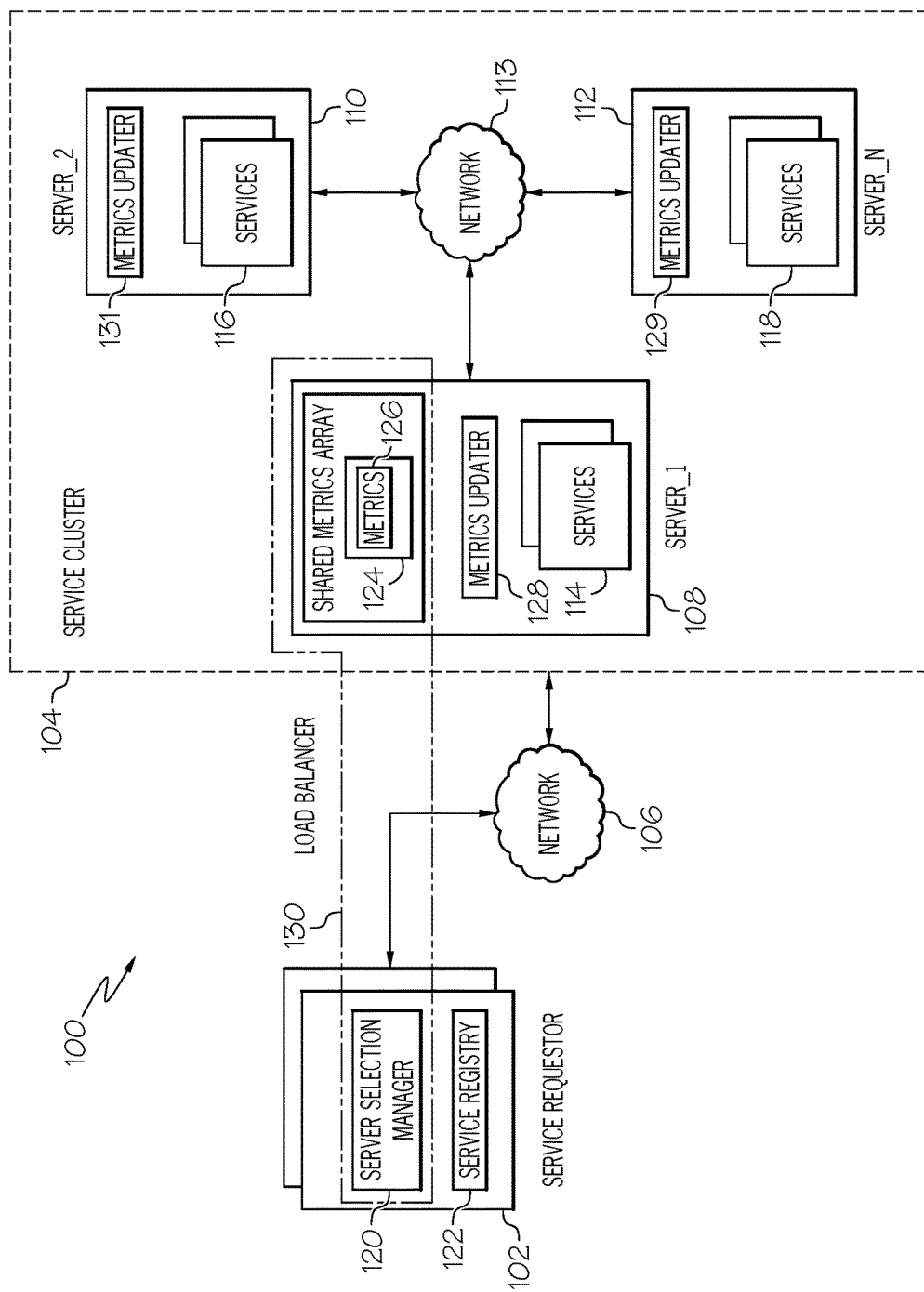
FIG. 1 is a block diagram illustrating one example of an operating environment according to one embodiment of the present disclosure.

FIG. 1 illustrates a general overview of one operating environment 100 according to one embodiment of the present disclosure. In one embodiment, the operating environment 100 comprises one or more service requestors 102 communicatively coupled to at least one service cluster 104 via one or more networks 106. In this embodiment, the service cluster 104 comprises a plurality of computing devices 108, 110, 112 such as multiple servers that are communicatively coupled together via a network 113. Multiple services 114, 116, 118 are distributed across each of the computing devices 108, 110, 112.

In one embodiment, the service requestor 102 is a computing device such as (but not limited to) a server, personal computing device, and/or the like. The service requestor 102 comprises, for example, a service registry 120 and a server selection manager 122. The service registry 120 identifies each of the services 114, 116, 118 provided/hosted by each of the servers 108, 110, 112 in the cluster 104. The service registry 120 and server selection manager 122 are discussed in greater detail below.

FIG. 1 further shows that at least one of the servers 108 in the cluster 104 comprises a shared metrics array 124. The shared metrics array 124 is maintained in a portion of memory/storage on the server 108 that is shared between each of the servers 108, 110, 112 in the cluster 104. Stated differently each of the servers 108, 110, 112 in the cluster 104 can access the shared metrics array 124. In one embodiment, the shared metrics array 124 comprises various metrics 126 associated with each of the servers 108, 110, 112. These metrics 126 include any type of metrics that allow a service requester 102 to identify and select a server to satisfy a service request. Examples of metrics include (but are not limited to) current server capacity, load/performance, I/O and/or memory pressure, service type affinity, global health status (including temperature sensors, disk SMART health, and/or the like. In one embodiment, the shared metrics array 124 is stored within a portion of memory/storage 127 that is shared across at least a plurality of the servers 108, 110, 112 in the cluster 104.

Figure 2:
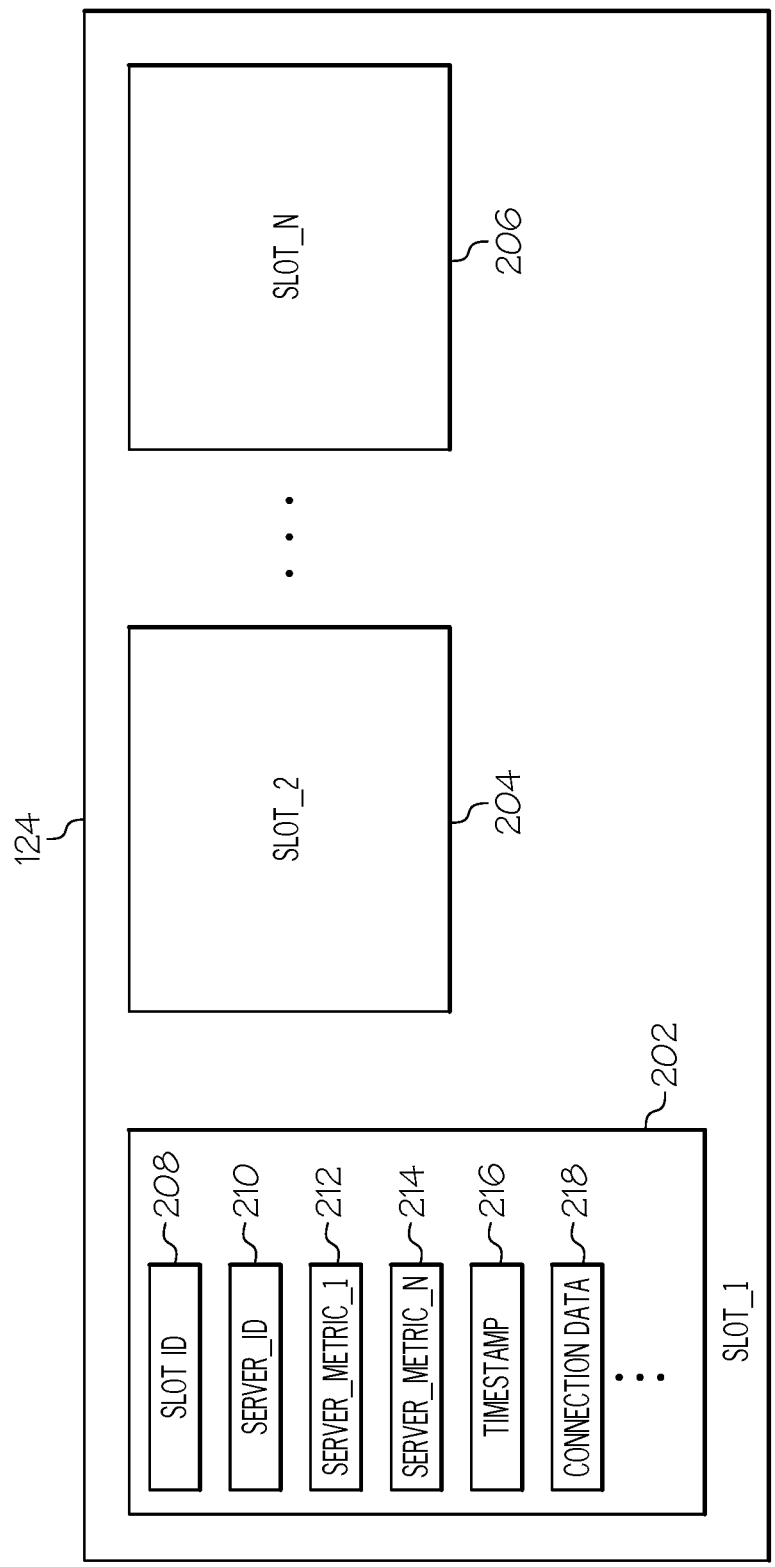
FIG. 2 is a block diagram illustrating one example of a shared metrics array used for load balancing service requests according to one embodiment of the present disclosure.

FIG. 2 shows a more detailed example of the shared metrics array 124. In this example, the shared metrics array 124 comprises a plurality of slots 202, 204, 206. Each slot is associated with one of the servers 108, 110, 112 in the cluster 104. For example, Slot_1 is associated with Server_1, Slot_2 is associated with Server_2, and Slot_N is associated with Server_N. In one embodiment, only the server associated with a given slot 202, 204, 206 can access and update the slot. Each slot 202, 204, 206 comprises, for example, a unique identifier (ID) 208 that identifies the slot, a unique ID 210 identifying the server associated with the slot, one or more server metrics 212, 214 utilized by a service requestor for selecting a server, a timestamp 216 indicating when the metric data 212, 214 was last updated, and connection information 218 to the server associated with the slot (e.g., IP:PORT) . The shared metrics array 124, in one embodiment, also includes information identifying the size of the array 124.

In one embodiment, each server 108, 110, 112 in the cluster 104 comprises a metric updater 128, 129, 131 for updating the metrics 126 associated with the server in the shared metrics array 124. The metric updater 128, 129, 131 communicates with the sever 108 comprising the shared metrics array 124 to update the metrics data 126 within its associated slot 202, 204, 206. In one embodiment, the metric updater 128, 129, 131 directly accesses the slot 202, 204, 206 associated with its server. In this embodiment, the metric updater 128, 129, 131 directly updates the metric data 126. For example, the metric updater 128, 129, 131 utilizes one or more hardware-accelerated remote direct memory access (RDMA) operations such as an RDMA write to directly update the metrics 126. However, in another embodiment, the metric updater 128, 129, 131 sends an update request to the server 108 comprising the shared metrics array 124. In this embodiment, the update request comprises, for example, the slot ID and/or the server ID, operation to be performed (e.g., update metric data, delete metric data, add metric data, etc.), and metric data 126. The server 108 utilizes the data within the update request to identify the slot 202 204, 206 in the shared metrics array 124 associated with the server that sent the request. The server 108 then performs the requested operation on the metric data 126 within the identified slot 202, 204, 206.

In one embodiment, the server selection manager 122 of the service requestor 102 and the shared metrics array 124 of the server 108 form a distributed load-balancer 130. This load-balancer 130 is advantageous over conventional load-balancers since it is distributed across the service requestor 102 and at least one of the servers 108, 110, 112 in the cluster 104. This configuration removes the conventional intermediary device that usually comprises the load-balancer. Therefore, the load-balancer 130 of one or more embodiments consumes less computing resources and reduces latency in the operating environment 100.

Figure 3:
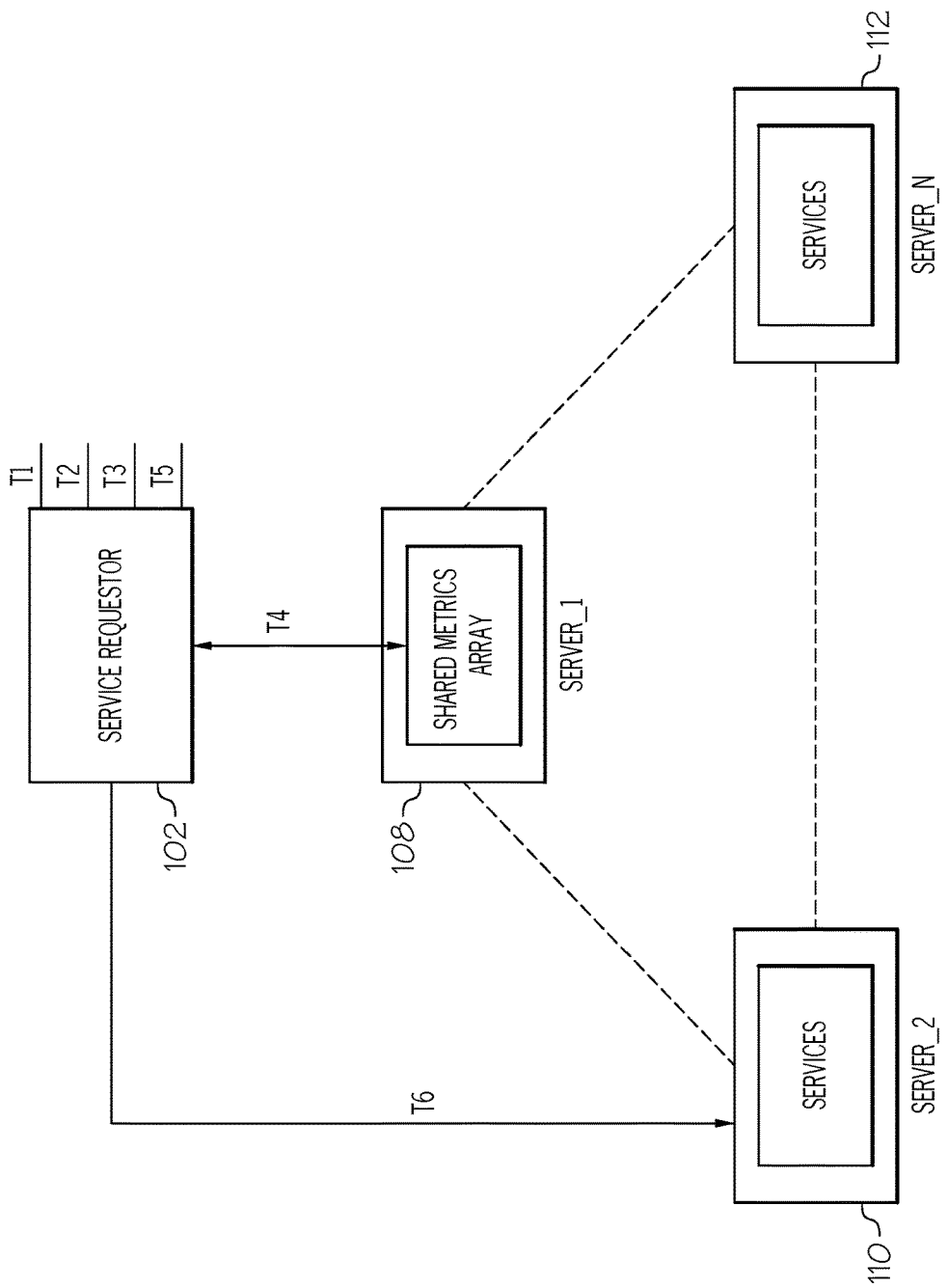
FIG. 3 is a transactional diagram illustrating one example of a service requestor load balancing service requests utilizing a shared metrics array according to one embodiment of the present disclosure.

Turning now to FIG. 3, a transactional diagram is provided illustrating one example of load-balancing service requests across the servers in the cluster 104. At T1, the service requestor 102 generates a service request and/or receives a service request from one or more other service requestors. The server selection manager 122 of the load-balancer 130 analyzes the service registry 120 to identify the servers 108, 110, 112 comprising services 114, 116, 118 that can satisfy the service request, at T2. The server selection manager 122 then selects at least one of the identified servers 108, 110, 112 to satisfy the request, at T3. The server selection manager 122 can utilize any type of selection process/policy such as (but not limited to) round-robin, random, lowest CPU, highest bandwidth, etc.

Once a server is selected, the server selection manager 122 directly accesses the shared metrics array 124, at T4. In one embodiment, the server selection manager 122 utilizes one or more hardware-accelerated remote direct memory access (RDMA) operations to access the shared metrics array 124 and locate the slot 202, 204, 206 associated with the selected server(s). For example, using the server ID, the server selection manager 122 computes the location of the server's metrics in the shared metrics array 124 and performs an RDMA read operation. This RDMA read operation retrieves the metrics information using the computed location of the metrics and their size, usually defined as constant.

The server selection manager 122 analyzes the metric data 126 from the slot to determine if the service request should be sent to the selected server, at T5. In one embodiment, the choice of sending or not sending the request to the selected server is dependent on a user-defined, client-side load balancing policy. Such policies can use various algorithms such as round-robin, random pick, or a more complex algorithm that uses part or all of the metrics to define the final choice. Examples of more complex algorithms are low average CPU load, low average network bandwidth usage, lowest CPU load in a quorum of randomly chosen servers, or lowest network bandwidth usage in a quorum of randomly chosen servers. If the server selection manager 122 determines that the service request should be sent to the selected server, the server selection manager 122 sends the service request to the selected server, at T6. In one embodiment, the connection information within the shared metrics array slot 202, 204, 206 associated with the server is utilized by the server selection manager 122 to send the service request to the selected server.

It should be noted that, in another embodiment, the server selection manager 122 first accesses the shared metrics array 124 prior to selecting a server. For example, the server selection manager 122 can access one or more slots 202, 204, 206 in the array 124 and analyze the metric data 126 in these slots. The server selection manager 122 can then select at least one server for receiving the service request based on the analyzed metric data 126. As discussed above, the server selection manager 122 can utilize any type of selection process/policy such as (but not limited to) round-robin, random, lowest CPU, highest bandwidth, etc. It should be noted that the server selection manager 122 can also utilize one or more selection processes to select one or more of the slots 202, 204, 206.

As can be seen from the above discussion, one or more embodiments enable a service requestor to perform load balancing of service requests across one or more servers in a service cluster. The service requestor is able to directly access a shared metrics array stored at one or more of the servers. Hardware-accelerated RDMA operations can be utilized for this direct access. The service requestor utilizes server metric information stored within the shared metrics array to select a server for receiving a service request sent from the service requestor.

Figure 4:
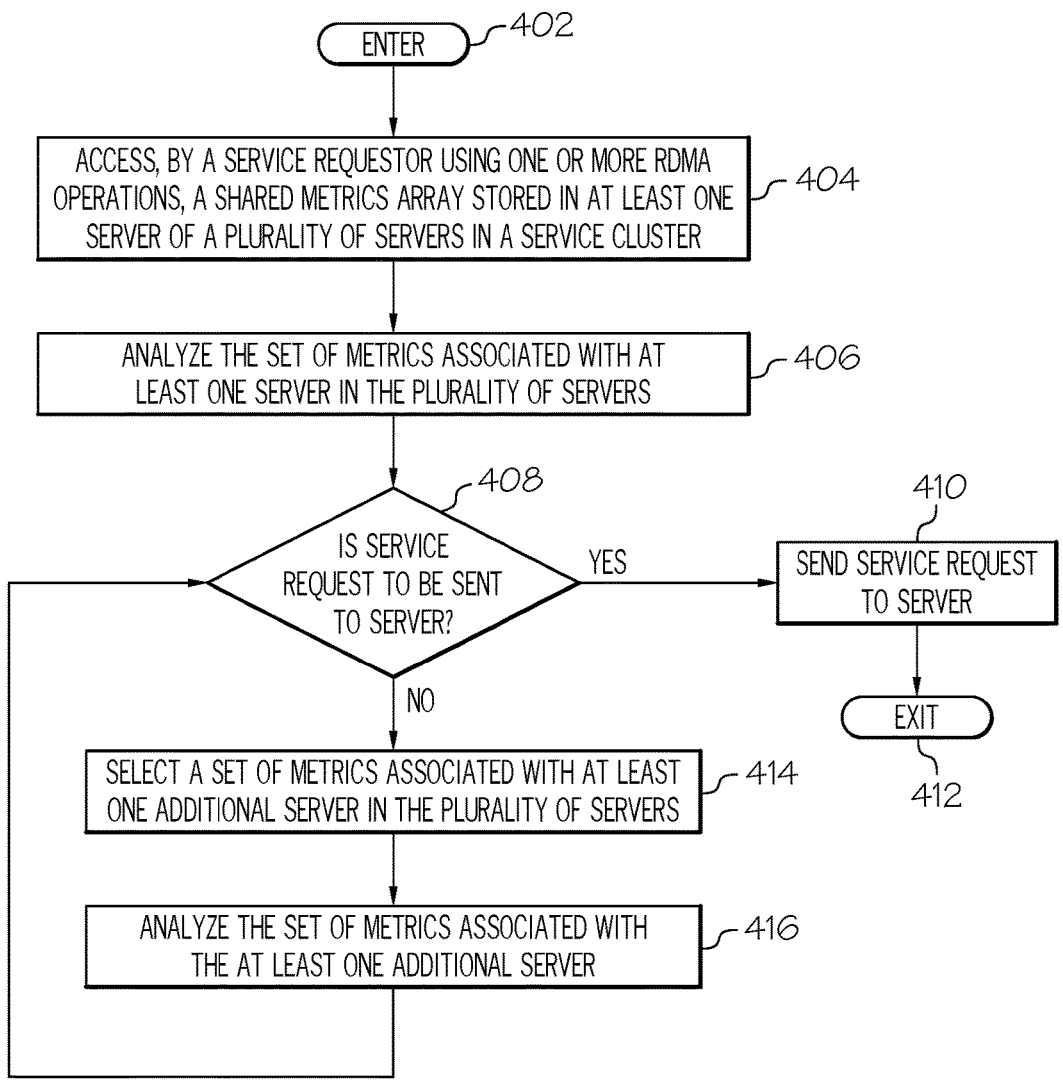
FIG. 4 is an operational flow diagram illustrating one example of a service requestor load balancing service requests utilizing a shared metrics array according to one embodiment of the present disclosure.

FIG. 4 is an operational flow diagram illustrating one example of a service requestor load balancing service requests utilizing a shared metrics array. The operational flow diagram of FIG. 4 begins at step 402 and flows directly to step 404. A load balancer 130 situated at a service requestor 102, at step 404, accesses a shared metrics array 124 stored in at least one server 108 of a plurality of servers in a service cluster 104. Each of these servers 108, 110, 112 comprises one or more services 114, 116, 118. The shared metrics array 124 is accessible by each of the plurality of servers, and comprises a set of metrics 126 for each of the plurality of servers.

The load balancer 130, at step 406, analyzes a set of metrics 126 associated with at least one server in the plurality of servers. The load balancer 130, at step 408, makes a determination, based on the set of metrics 126 associated with at least one server in the plurality of servers, if a service request is to be sent to the at least one server. If the result of this determination is positive, the load balancer 130, at step 410, sends the service request to the at least one server based on determining that the service request is to be sent to the at least one sever. The control flow exits at step 412. If the result of the determination is negative, the load balancer 130, at step 414, selects a set of metrics 126 associated with at least one additional server in the plurality of servers. The load balancer 130, at step 416, analyzes, the set of metrics 126 associated with at the at least one additional server. The load balancer 130 then repeats the flow discussed above with respect to steps 406 to 412.

Figure 5:
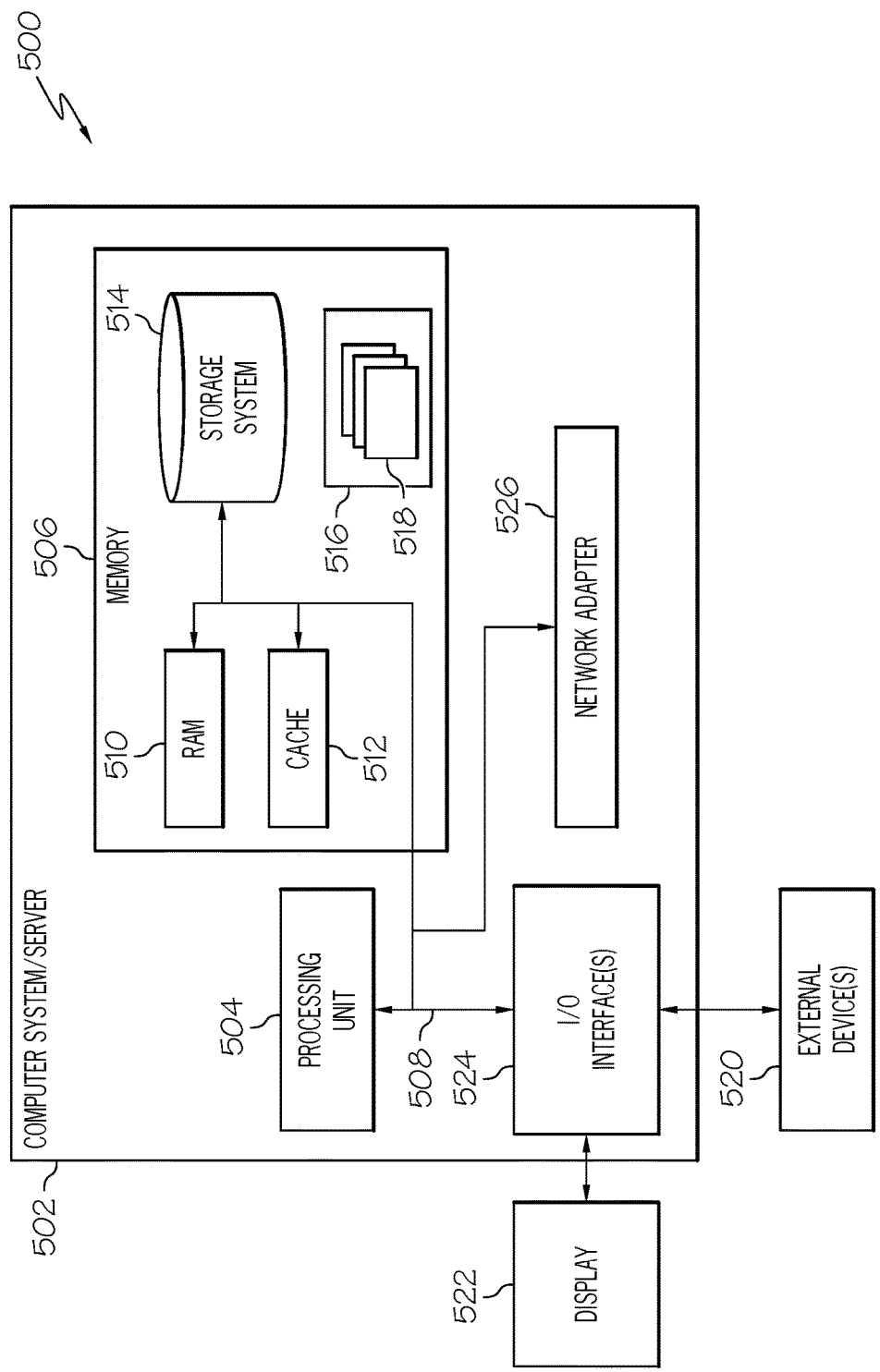
FIG. 5 is a block diagram illustrating one example of an information processing system discovering services in a service-oriented environment.

Referring now to FIG. 5, this figure is a block diagram illustrating an information processing system that can be utilized in embodiments of the present disclosure. The information processing system 502 is based upon a suitably configured processing system adapted to implement one or more embodiments of the present disclosure (e.g., the server 218, 220 of FIG. 2). Any suitably configured processing system can be used as the information processing system 500 in embodiments of the present disclosure. The components of the information processing system 502 can include, but are not limited to, one or more processors or processing units 504, a system memory 506, and a bus 508 that couples various system components including the system memory 506 to the processor 504.

The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 5, the main memory 506 includes the service registry 120 and at least a portion of the load balancer 130 comprising the server selection manager 122. In another embodiment, at least the portion of the load balancer 130 comprising the server selection manager 122 can reside within the processor 504, or be a separate hardware component.

The system memory 506 can also include computer system readable media in the form of volatile memory, such as random access memory (RAM) 510 and/or cache memory 512. The information processing system 502 can further include other removable/non-removable, volatile/non-volatile computer system storage media. By way of example only, a storage system 514 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 508 by one or more data media interfaces. The memory 506 can include at least one program product having a set of program modules that are configured to carry out the functions of an embodiment of the present disclosure.

Program/utility 516, having a set of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of embodiments of the present disclosure.

The information processing system 502 can also communicate with one or more external devices 520 such as a keyboard, a pointing device, a display 522, etc.; one or more devices that enable a user to interact with the information processing system 502; and/or any devices (e.g., network card, modem, etc.) that enable computer system/server 502 to communicate with one or more other computing devices. Such communication can occur via I/O interfaces 524. Still yet, the information processing system 502 can communicate with one or more networks such as a local area network (LAN), a general wide area network (WAN), and/or a public network (e.g., the Internet) via network adapter 526. As depicted, the network adapter 526 communicates with the other components of information processing system 502 via the bus 508. Other hardware and/or software components can also be used in conjunction with the information processing system 502. Examples include, but are not limited to: microcode, device drivers, redundant processing units, external disk drive arrays, RAID systems, tape drives, and data archival storage systems.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with an information processing system, for load balancing service requests across one or more servers, the method comprising:

selecting, in response to obtaining a service request, at least one server of a plurality of servers in a service cluster for receiving the service request, wherein each server in the plurality of servers comprises at least one service for satisfying the service request;

accessing, by the information processing system in response to obtaining the service request, a shared metrics array stored in memory of at least one server of a plurality of servers in a service cluster, wherein the accessing comprises performing one or more remote direct memory access operations on a memory of the at least one server comprising the shared metrics array, where the information processing system comprises the service request and is external to the service cluster, the shared metrics array being accessible at the server by each of the plurality of servers, wherein the shared metrics array comprises a set of metrics for each of the plurality of servers, and wherein each of the plurality of servers comprises one or more services, the shared metrics array being directly accessed in the memory of the server by the information processing system without involving a processor of the at least one server;

determining, based on the set of metrics associated with at least one server in the plurality of servers, if the service request is to be sent to the at least one server; and sending the service request to the at least one server based on determining that the service request is to be sent to the at least one sever.

2. The method of claim 1, further comprising:
selecting the at least one server based on one or more selection policies.

3. The method of claim 1, wherein the accessing comprises:
identifying a portion of the shared metrics array associated with the at least one server; and
analyzing the set of metrics associated with the at least one server.

4. The method of claim 1, further comprising:
based determining that the service request is not to be sent to the at least one server;
selecting at least one additional server from the plurality of servers; and
sending the service request to the at least one additional server based on the set of metrics associated with the at least one additional server.

5. The method of claim 1, wherein the shared metrics array comprises a plurality of slots, wherein each slot in the plurality of slots is associated with one of the plurality of servers and comprises the set of metrics for the one of the plurality of servers.

6. The method of claim 5, a given slot in the plurality of slots is updatable only by its associated server in the plurality of servers.

7. The method of claim 5, wherein each slot in the plurality of slots further comprises at least one of:
a timestamp associated with a most recent update to set of metrics stored within the slot;
an identifier associated with the server associated with the slot; and
a set of connection information for the server associated with the slot.

8. An information processing system for load balancing service requests across one or more servers, the information processing system comprising:
a processor;
a memory communicatively coupled to the processor; and
a load balancer communicatively coupled to the processor and the memory, the load balancer configured to perform a method comprising:
selecting, in response to obtaining a service request, at least one server of a plurality of servers in a service cluster for receiving the service request, wherein each server in the plurality of servers comprises at least one service for satisfying the service request;
accessing, based on obtaining the service request, a shared metrics array stored in memory of at least one server of the plurality of servers in a service cluster, wherein the accessing comprises performing one or more remote direct memory access operations on a memory of the at least one server comprising the shared metrics array,
where the information processing system is external to the service cluster and comprises service request, the shared metrics array being accessible at the server by each of the plurality of servers, wherein the shared metrics array comprises a set of metrics for each of the plurality of servers, and wherein each of the plurality of servers comprises one or more services, the shared metrics array being directly accessed in the memory of the server by the load balancer without involving a processor of the at least one server;
determining, based on the set of metrics associated with at least one server in the plurality of servers, if the service request is to be sent to the at least one server; and
sending the service request to the at least one server based on determining that the service request is to be sent to the at least one sever.

9. The information processing system of claim 8, wherein the shared metrics array comprises a plurality of slots, wherein each slot in the plurality of slots is associated with one of the plurality of servers and comprises the set of metrics for the one of the plurality of servers.

10. The information processing system of claim 9, wherein each slot in the plurality of slots further comprises at least one of:
a timestamp associated with a most recent update to set of metrics stored within the slot;
an identifier associated with the server associated with the slot; and
a set of connection information for the server associated with the slot.

11. A computer program storage product for load balancing service requests across one or more servers, the computer program storage product comprising a non-transitory storage medium readable storing instructions for execution by an information processing system for performing a method comprising:
selecting, in response to obtaining a service request, at least one server of a plurality of servers in a service cluster for receiving the service request, wherein each server in the plurality of servers comprises at least one service for satisfying the service request;
accessing, by the information processing system in response to obtaining the service request, a shared metrics array stored in memory of at least one server of a plurality of servers in a service cluster, wherein the accessing comprises performing one or more remote direct memory access operations on a memory of the at least one server comprising the shared metrics array,
where the information processing system comprises the service request and is external to the service cluster, the shared metrics array being accessible at the server by each of the plurality of servers, wherein the shared metrics array comprises a set of metrics for each of the plurality of servers, and wherein each of the plurality of servers comprises one or more services, the shared metrics array being directly accessed in the memory of the server by the information processing system without involving a processor of the at least one server;
determining, based on the set of metrics associated with at least one server in the plurality of servers, if the service request is to be sent to the at least one server; and
sending the service request to the at least one server based on determining that the service request is to be sent to the at least one sever.

12. The computer program storage product of claim 11, wherein the accessing comprises:
   identifying a portion of the shared metrics array associated with the at least one server; and
   analyzing the set of metrics associated with the at least one server.

13. The computer program storage product of claim 11, wherein the method further comprises:
   based determining that the service request is not to be sent to the at least one server;
   selecting at least one additional server from the plurality of servers; and
   sending the service request to the at least one additional server based on the set of metrics associated with the at least one additional server.

14. The computer program storage product of claim 11, wherein the shared metrics array comprises a plurality of slots, wherein each slot in the plurality of slots is associated with one of the plurality of servers and comprises the set of metrics for the one of the plurality of servers.

15. The computer program storage product of claim 14, a given slot in the plurality of slots is updatable only by its associated server in the plurality of servers.

16. The computer program storage product of claim 14, wherein each slot in the plurality of slots further comprises at least one of:
   a timestamp associated with a most recent update to set of metrics stored within the slot;
   an identifier associated with the server associated with the slot; and
   a set of connection information for the server associated with the slot.

* * * * *